(12) United States Patent
Song et al.

(10) Patent No.: US 9,432,922 B1
(45) Date of Patent: Aug. 30, 2016

(54) SYSTEM AND METHOD FOR CELL SEARCH ENHANCEMENT IN AN LTE SYSTEM

(71) Applicant: Samsung Electronics Co., Ltd., Gyeonggi-do (KR)

(72) Inventors: Kee-bong Song, San Diego, CA (US); Shengshan Cui, San Diego, CA (US); Hairuo Zhuang, San Diego, CA (US); Yangwen Liang, San Diego, CA (US); Vignesh Sethuraman, La Jolla, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/964,227

(22) Filed: Dec. 9, 2015

Related U.S. Application Data (60) Provisional application No. 62/220,493, filed on Sep. 18, 2015, provisional application No. 62/220,481, filed on Sep. 18, 2015.

(51) Int. Cl.
  *H04W 4/20* (2009.01)
  *H04W 48/16* (2009.01)

(52) U.S. Cl.
  CPC .............. *H04W 48/16* (2013.01); *H04W 4/20* (2013.01)

(58) Field of Classification Search
  CPC .............................. H04W 48/16; H04W 4/20
  See application file for complete search history.

(56) References Cited

U.S. PATENT DOCUMENTS

| | | | |
|---|---|---|---|
| 7,110,376 B2 * | 9/2006 | Lindoff .............. | H04B 1/70755 370/331 |
| 2014/0071960 A1 * | 3/2014 | Gorokhov ............. | H04W 24/02 370/336 |
| 2014/0293954 A1 | 10/2014 | Horvat et al. | |
| 2015/0071103 A1 * | 3/2015 | Xu ........................ | H04L 43/028 370/252 |

* cited by examiner

*Primary Examiner* — Asghar Bilgrami
(74) *Attorney, Agent, or Firm* — The Farrell Law Firm, P.C.

(57) ABSTRACT

Apparatuses (including user equipment (UE) and modem chips for UE), systems, and methods for reducing false alarms (FAs) and miss-detections (MDs) in cell search results are described. In one method, the minimum of a value for the accumulated metric for a first short code and a value for the accumulated metric for a second short code is used as a pruning metric for each candidate cell. One or more thresholds are applied to the pruning metric to determine whether the candidate cell will be pruned from the final candidate cell list.

20 Claims, 4 Drawing Sheets

| $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ |
|---|---|---|---|---|---|---|---|---|---|---|---|---|---|---|---|---|---|
| 0 | 0 | 1 | 34 | 4 | 6 | 68 | 9 | 12 | 102 | 15 | 19 | 136 | 22 | 27 |
| 1 | 1 | 2 | 35 | 5 | 7 | 69 | 10 | 13 | 103 | 16 | 20 | 137 | 23 | 28 |
| 2 | 2 | 3 | 36 | 6 | 8 | 70 | 11 | 14 | 104 | 17 | 21 | 138 | 24 | 29 |
| 3 | 3 | 4 | 37 | 7 | 9 | 71 | 12 | 15 | 105 | 18 | 22 | 139 | 25 | 30 |
| 4 | 4 | 5 | 38 | 8 | 10 | 72 | 13 | 16 | 106 | 19 | 23 | 140 | 0 | 6 |
| 5 | 5 | 6 | 39 | 9 | 11 | 73 | 14 | 17 | 107 | 20 | 24 | 141 | 1 | 7 |
| 6 | 6 | 7 | 40 | 10 | 12 | 74 | 15 | 18 | 108 | 21 | 25 | 142 | 2 | 8 |
| 7 | 7 | 8 | 41 | 11 | 13 | 75 | 16 | 19 | 109 | 22 | 26 | 143 | 3 | 9 |
| 8 | 8 | 9 | 42 | 12 | 14 | 76 | 17 | 20 | 110 | 23 | 27 | 144 | 4 | 10 |
| 9 | 9 | 10 | 43 | 13 | 15 | 77 | 18 | 21 | 111 | 24 | 28 | 145 | 5 | 11 |
| 10 | 10 | 11 | 44 | 14 | 16 | 78 | 19 | 22 | 112 | 25 | 29 | 146 | 6 | 12 |
| 11 | 11 | 12 | 45 | 15 | 17 | 79 | 20 | 23 | 113 | 26 | 30 | 147 | 7 | 13 |
| 12 | 12 | 13 | 46 | 16 | 18 | 80 | 21 | 24 | 114 | 0 | 5 | 148 | 8 | 14 |
| 13 | 13 | 14 | 47 | 17 | 19 | 81 | 22 | 25 | 115 | 1 | 6 | 149 | 9 | 15 |
| 14 | 14 | 15 | 48 | 18 | 20 | 82 | 23 | 26 | 116 | 2 | 7 | 150 | 10 | 16 |
| 15 | 15 | 16 | 49 | 19 | 21 | 83 | 24 | 27 | 117 | 3 | 8 | 151 | 11 | 17 |
| 16 | 16 | 17 | 50 | 20 | 22 | 84 | 25 | 28 | 118 | 4 | 9 | 152 | 12 | 18 |
| 17 | 17 | 18 | 51 | 21 | 23 | 85 | 26 | 29 | 119 | 5 | 10 | 153 | 13 | 19 |
| 18 | 18 | 19 | 52 | 22 | 24 | 86 | 27 | 30 | 120 | 6 | 11 | 154 | 14 | 20 |
| 19 | 19 | 20 | 53 | 23 | 25 | 87 | 0 | 4 | 121 | 7 | 12 | 155 | 15 | 21 |
| 20 | 20 | 21 | 54 | 24 | 26 | 88 | 1 | 5 | 122 | 8 | 13 | 156 | 16 | 22 |
| 21 | 21 | 22 | 55 | 25 | 27 | 89 | 2 | 6 | 123 | 9 | 14 | 157 | 17 | 23 |
| 22 | 22 | 23 | 56 | 26 | 28 | 90 | 3 | 7 | 124 | 10 | 15 | 158 | 18 | 24 |
| 23 | 23 | 24 | 57 | 27 | 29 | 91 | 4 | 8 | 125 | 11 | 16 | 159 | 19 | 25 |
| 24 | 24 | 25 | 58 | 28 | 30 | 92 | 5 | 9 | 126 | 12 | 17 | 160 | 20 | 26 |
| 25 | 25 | 26 | 59 | 0 | 3 | 93 | 6 | 10 | 127 | 13 | 18 | 161 | 21 | 27 |
| 26 | 26 | 27 | 60 | 1 | 4 | 94 | 7 | 11 | 128 | 14 | 19 | 162 | 22 | 28 |
| 27 | 27 | 28 | 61 | 2 | 5 | 95 | 8 | 12 | 129 | 15 | 20 | 163 | 23 | 29 |
| 28 | 28 | 29 | 62 | 3 | 6 | 96 | 9 | 13 | 130 | 16 | 21 | 164 | 24 | 30 |
| 29 | 29 | 30 | 63 | 4 | 7 | 97 | 10 | 14 | 131 | 17 | 22 | 165 | 0 | 7 |
| 30 | 0 | 2 | 64 | 5 | 8 | 98 | 11 | 15 | 132 | 18 | 23 | 166 | 1 | 8 |
| 31 | 1 | 3 | 65 | 6 | 9 | 99 | 12 | 16 | 133 | 19 | 24 | 167 | 2 | 9 |
| 32 | 2 | 4 | 66 | 7 | 10 | 100 | 13 | 17 | 134 | 20 | 25 | - | - | - |
| 33 | 3 | 5 | 67 | 8 | 11 | 101 | 14 | 18 | 135 | 21 | 26 | - | - | - |

SYSTEM AND METHOD FOR CELL SEARCH ENHANCEMENT IN AN LTE SYSTEM

PRIORITY

The present application claims priority under 35 U.S.C. §119(e) to U.S. Provisional Application No. 62/220,493, entitled "SYSTEM AND METHOD FOR CELL SEARCH ENHANCEMENT IN AN LTE SYSTEM," which was filed on Sep. 18, 2015, and to U.S. Provisional Application No. 62/220,481, entitled "SYSTEM AND METHOD FOR RSRP MEASUREMENT IN AN LTE UE RECEIVER," which was filed on Sep. 18, 2015, the contents of all of which are incorporated herein by reference.

FIELD OF THE DISCLOSURE

The present disclosure relates generally to improving cell search operations by a User Equipment (UE) in a Long Term Evolution (LTE) cellular communication network and, more specifically, to eliminating false alarms (FAs) and reducing miss-detections (MDs) in cell search results.

BACKGROUND

Cell searching is when a UE detects and identifies any base stations whose downlink signals are currently being received by the UE. Herein, "base station" or "BS", "evolved node B" or "eNB", and "cell" may be used interchangeably, depending on the context. Cell searching is an essential physical layer procedure for a UE because it ensures that the UE is able to synchronize in both time and frequency with an LTE downlink signal. Cell searching must be performed when the modem in a UE is powered up, and is required to support inter-frequency/intra-frequency and/or multi-Radio Access Technology (RAT) handovers/measurements while the modem is operating.

Figure 1:
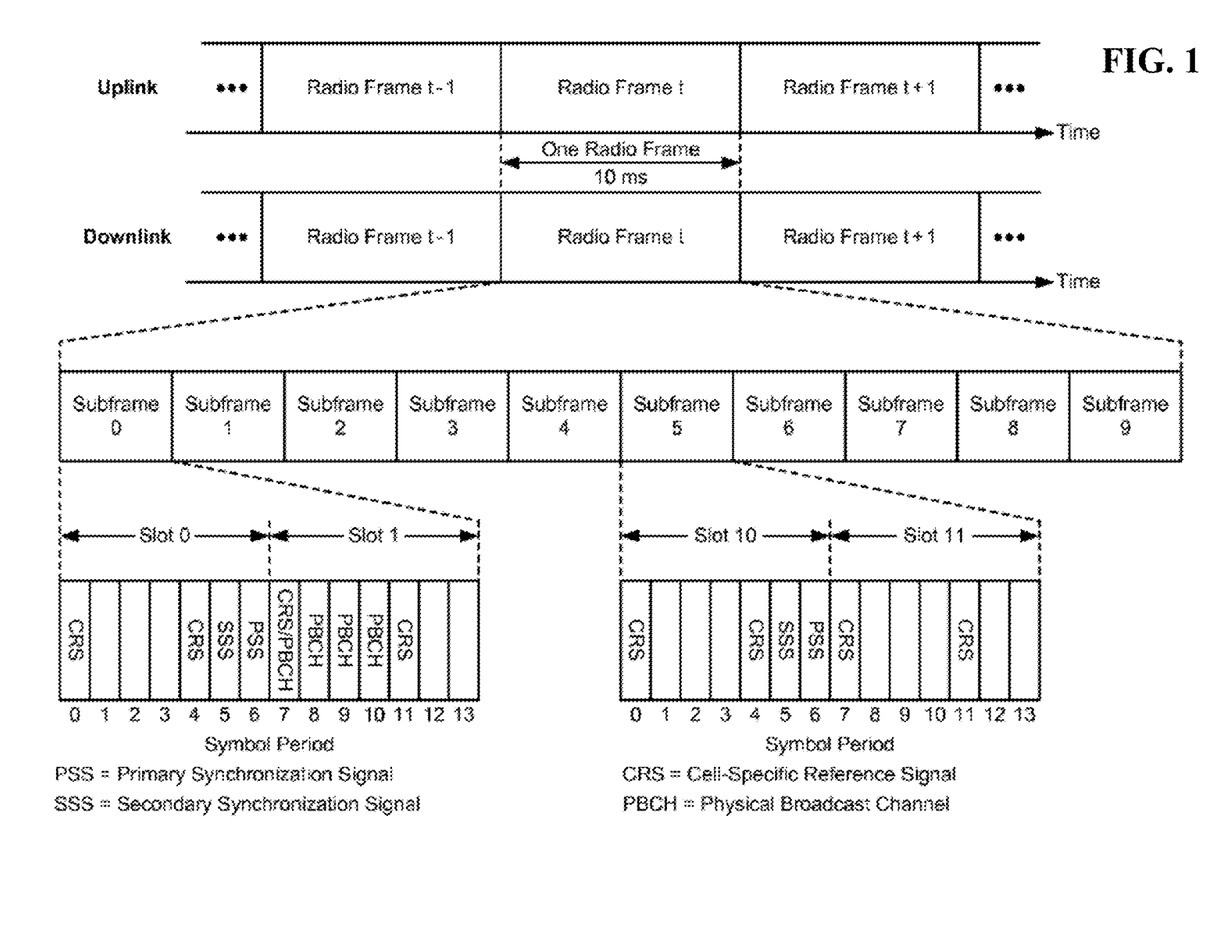
FIG. 1 shows a breakdown of an LTE Frequency Division Duplexing (FDD) downlink (DL) frame into its constituent subframes and slots and indicates where various pertinent signals are located within an FDD DL frame.

When cell searching, the UE relies upon certain signals to detect, identify, and initially synchronize with one or more eNBs. FIG. 1 shows some of these signals and their locations within an LTE Frequency Division Duplexing (FDD) downlink (DL) frame. FIG. 1 is based on a drawing in U.S. Pat. No. 9,078,146 to Gorokhov et al., which is incorporated herein by reference in its entirety. FIG. 1 shows that a single 10 ms DL radio frame includes ten 1 ms subframes, labelled 0 through 9, each subframe includes two slots, and each slot includes seven symbols (in the time domain). The symbols are labelled by each subframe (i.e., not by slot) 0 to 13, and each slot in the frame is labelled from 0 to 19. FIG. 1 does not show how the slots are also divided in the frequency domain by subcarriers.

Related to the present disclosure are the signals and channels labelled within slots 0, 1, 10, and 11 in FIG. 1. The eNB transmits a primary synchronization signal (PSS) in the last symbol of Slot 0 and Slot 10 and a secondary synchronization signal (SSS) in the second-to-last symbol of Slots 0 and 10. The eNB transmits cell-specific reference signals (CRSs), which identify the eNB and may also identify the antenna port of the eNB, in the first and fifth symbol of every slot (i.e., Symbols 9, 4, 7, and 11 of every subframe). Lastly, the eNB transmits the physical broadcast channel (PBCH) in the first through fourth symbols of the second slot (i.e., Symbols 7, 8, 9, and 10 of Slot 1 in Subframe 0).

In cell searching, the UE first detects the PSS, which is then used for a very rough timing synchronization (e.g., 5 ms), which allows the UE to then detect the SSS, which provides the physical layer cell identity $N_{ID}^{cell}$ and allows the UE to synchronize with the frame. Since all of the frames in the network have the same timing, all of the nearby cells will have the same synchronization (discounting, for the moment, the complexities of path delay, for example). The UE can then decode the PBCH, which was scrambled prior to modulation with a cell-specific sequence that depends upon the cell's identity $N_{ID}^{cell}$ and which contains the master information block (MIB).

The physical layer cell identity $N_{ID}^{cell}$ is defined by Equation (1):

$$N_{ID}^{cell} = 3N_{ID}^{(1)} + N_{ID}^{(2)} \qquad (1)$$

where $N_{ID}^{(1)}$ represents the physical layer cell identity group and is provided by the SSS and $N_{ID}^{(2)}$ represents the physical layer identity within the physical layer cell identity group and is provided by the PSS. See, e.g., 3GPP TS 36.211, ver. 10.7.0 (2013-02), which is incorporated herein by reference in its entirety. The sequence used for the SSS is an interleaved concatenation of two length-31 binary sequences $s_0^{(m_0)}(n)$ and $s_1^{(m_1)}(n)$ (also known as "short codes"), where $m_0$ and $m_1$ are the indices for the short codes/sequences $s_0$ and $s_1$, respectively. Often (including in the instant disclosure), the indices are used to refer to the short codes themselves or the power measurements for the short codes. Together, short codes/sequences $s_0^{(m_0)}(n)$ and $s_1^{(m_1)}(n)$ provide 168 different physical layer cell identity groups, as shown in FIG. 2, which is taken from Table 6.11.2.1-1: Mapping between physical-layer cell-identity group $N_{ID}^{(1)}$ and the indices $m_0$ and $m_1$ in 3GPP TS 36.211, ver. 10.7.0 (2013-02).

Cell searches can result in false alarms (FAs), where non-existent cells (also known as false cells or ghost cells) are detected. One cause of this is when two nearby cells have SSSs which share a short code, i.e., either the same $m_0$ or $m_1$. This can be seen in FIG. 2, where, e.g., the cell ID $N_{ID}^{(1)}=1$ has an $m_0=0$, but so does $N_{ID}^{(1)}=30$, $N_{ID}^{(1)}=59$, $N_{ID}^{(1)}=87$, $N_{ID}^{(1)}=114$, $N_{ID}^{(1)}=160$, and $N_{ID}^{(1)}=165$. Accordingly, if a cell has $N_{ID}^{(1)}=30$, and a nearby cell has $N_{ID}^{(1)}=114$, they would have the same $s_0^{(m_0)}(n)$. This overlap in constituent short codes results in what is known as a "short code collision", which, in turn, can result in a ghost cell being detected. Other causes of ghost cells include imperfect PSS/SSS cross-correlations between two cell IDs and random noise/interference.

Besides FAs, cell searches can also result in miss-detections (MDs), i.e., where actual, existing cells are not detected. To further complicate the matter, improvements in eliminating FAs usually result in the increase of MDs, so any engineering solution normally requires a tradeoff between the two.

FAs and MDs cause inaccurate cell search results, which, in turn, impairs modem performance, UE performance, BS performance, and overall cellular network performance. As one example, a UE reporting a ghost cell may trigger the network to initiate the Automatic Neighbor Relation (ANR) procedure, which is destined to fail (being initiated by a non-existent cell) and may further cause a radio link failure.

Traditional cell searches only report candidate cells based on a single-shot cell search followed by certain FA rejection procedures. The results suffer from the noisy nature of a single-shot cell search, and no consistency information is saved between consecutive searches.

SUMMARY

Accordingly, the present disclosure has been made to address at least the problems and/or disadvantages described above and to provide at least the advantages described below.

In one aspect of the present disclosure, a method is provided, including performing a search for cells whose signals can be received by a user equipment (UE); generating a preliminary candidate cell list including measurements for each candidate cell, if any, wherein the measurements result from the search for cells and comprise a metric for a first short code and a metric for a second short code, wherein a physical layer cell identity group for a cell is generated from the first and second short codes; checking a candidate cell database for a candidate cell record matching each candidate cell in the preliminary candidate cell list, wherein each candidate cell record includes accumulated measurements of a candidate cell; updating the matching candidate cell record based on a candidate cell record matching a candidate cell in the preliminary candidate cell list, by combining the measurements of the corresponding cell candidate in the preliminary candidate cell list with the accumulated measurements in the matching candidate cell record; generating a new candidate cell record for the candidate cell with the measurements of the cell candidate from the preliminary candidate cell list based on a candidate cell record not matching a candidate cell in the preliminary candidate cell list; and generating a pruning metric for each candidate cell based on the accumulated measurements in its candidate cell record, wherein the pruning metric includes the minimum of a value for the accumulated metric for the first short code and a value for the accumulated metric for the second short code.

In one aspect of the present disclosure, a user equipment (UE) is provided, including one or more non-transitory computer-readable media, wherein at least one of the one or more non-transitory computer-readable media stores a set of instructions; and one or more processors, wherein at least one of the one or more processors, when executing the set of instructions stored in the at least one of the one or more non-transitory computer-readable media, controls the UE to perform at least the following steps: performing a search for cells whose signals can be received by the UE; generating a preliminary candidate cell list including measurements for each candidate cell, if any, wherein the measurements result from the search for cells and include a metric for a first short code and a metric for a second short code, wherein a physical layer cell identity group for a cell is generated from the first and second short codes; checking a candidate cell database for a candidate cell record matching each candidate cell in the preliminary candidate cell list, wherein each candidate cell record includes accumulated measurements of a candidate cell; updating the matching candidate cell record based on a candidate cell record matching a candidate cell in the preliminary candidate cell list, by combining the measurements of the corresponding cell candidate in the preliminary candidate cell list with the accumulated measurements in the matching candidate cell record; generating a new candidate cell record for the candidate cell with the measurements of the cell candidate from the preliminary candidate cell list based on a candidate cell record not matching a candidate cell in the preliminary candidate cell list; and generating a pruning metric for each candidate cell based on the accumulated measurements in its candidate cell record, wherein the pruning metric includes the minimum of a value for the accumulated metric for the first short code and a value for the accumulated metric for the second short code.

In one aspect of the present disclosure, a user equipment (UE) is provided, including one or more antennas and a modem chip which performs a search for cells whose signals can be received by the UE; generates a preliminary candidate cell list including measurements for each candidate cell, if any, wherein the measurements result from the search for cells and includes a metric for a first short code and a metric for a second short code, wherein a physical layer cell identity group for a cell is generated from the first and second short codes; checks a candidate cell database for a candidate cell record matching each candidate cell in the preliminary candidate cell list, wherein each candidate cell record includes accumulated measurements of a candidate cell; updates the matching candidate cell record based on a candidate cell record matching a candidate cell in the preliminary candidate cell list, by combining the measurements of the corresponding cell candidate in the preliminary candidate cell list with the accumulated measurements in the matching candidate cell record; generates a new candidate cell record for the candidate cell with the measurements of the cell candidate from the preliminary candidate cell list based on a candidate cell record not matching a candidate cell in the preliminary candidate cell list; and generates a pruning metric for each candidate cell based on the accumulated measurements in its candidate cell record, wherein the pruning metric includes the minimum of a value for the accumulated metric for the first short code and a value for the accumulated metric for the second short code.

BRIEF DESCRIPTION OF THE DRAWINGS

The above and other aspects, features, and advantages of embodiments of the present disclosure will be more apparent from the following detailed description taken in conjunction with the accompanying drawings, in which:

FIG. 2 is a mapping between the physical-layer cell-identity group A $N_{ID}^{(1)}$ and the indices $m_0$ and $m_1$;

DETAILED DESCRIPTION OF EMBODIMENTS OF THE PRESENT DISCLOSURE

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Various embodiments may include one or more elements. An element may include any structure arranged to perform certain operations. Although an embodiment may be described with a limited number of elements in a certain arrangement by way of example, the embodiment may include more or less elements in alternate arrangement as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Presently, there is a need for apparatuses, systems, and methods for a UE to perform more accurate cell searches, where information can be accumulated over multiple searches.

Methods, systems, and apparatuses according to embodiments of the present disclosure effectively reduce both FAs and MDs using a new pruning metric, i.e., the minimum of the accumulated $m_0$ correlation and the accumulated $m_1$ correlation. According to embodiments of the present disclosure, only two thresholds are applied to the pruning metric, resulting in a significant reduction in fine tuning complexity compared with existing solutions. Moreover, embodiments of the present disclosure are not only applicable to LTE-to-LTE inter-frequency gap measurement scenario, but also applicable to any non-LTE-to-LTE scenarios. The present system and method may be applied to any radio access technology (RAT) to LTE scenario, for example, a 3G-to-LTE scenario.

Embodiments of the present disclosure can be flexibly implemented in modem hardware, firmware, software, and/or any combination thereof. As shown in the attached Appendix, one embodiment of the present disclosure may be implemented entirely in software without having to alter any hardware design, architecture, and/or components. In comparison with existing solutions, embodiments of the present disclosure result in a better tradeoff in performance between FA and MD, i.e., significantly reduce both true cell MD and ghost cell FA at the same time, resulting in improving the UE's performance as well as the user's experience.

In general, MDs and FAs result from random noise/interference and imperfect PSS/SSS cross-correlation. To reduce errors from random noise/interference, embodiments of the present disclosure perform soft combining of cell search results from multiple cell search attempts. Because of the general randomness of noise/interference, the probability of noise/interference generated the same exact error over multiple searches is low, meaning that the accumulated metrics involving errors, such as detection of ghost cells, usually do not increase over time. However, the accumulated metrics of true cells increase almost linearly over time. By exploiting this consistency over multiple consecutive search results, the confidence of candidate cell detection is greatly increased. To reduce imperfect PSS/SSS cross-correlation and short code collisions, as discussed above, a proper accumulating metric and pruning method should be selected. Embodiments of the present disclosure use the minimum of the $m_0$ and $m_1$ accumulated correlations as the pruning metric, to which one or more thresholds are applied.

Figure 3:
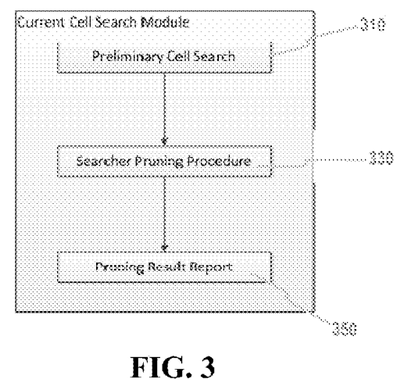
FIG. 3 is a schematic diagram of the procedures performed in a cell search.

FIG. 3 is a schematic diagram of the procedures performed in a cell search. In FIG. 3, a single shot cell search operation in hardware is assumed (Preliminary cell search module 310), which has results in many false alarms among the candidate cells. Next, Searcher pruning procedure module 330 is performed on those preliminary search results. Such pruning operations may include, for example, removing candidate cells based on candidate SSS correlation values (absolute threshold based pruning); removing candidate cells based on the ratio of the candidate SSS correlation output to its peak value relative to the ratio of output to peak values among all candidate cells (relative threshold based pruning); and removing candidate cells based on their $m_0$ or $m_1$ correlation ratios. The candidate cells remaining after pruning form a search result report which is further pruned (Pruning result report module 350). For example, if there cell candidates with the same cell ID (CID), but with different cyclic prefix (CP) types or frame timing, only the cell candidate with the strongest signal is retained, and the other cell candidates are removed.

Figure 4A:
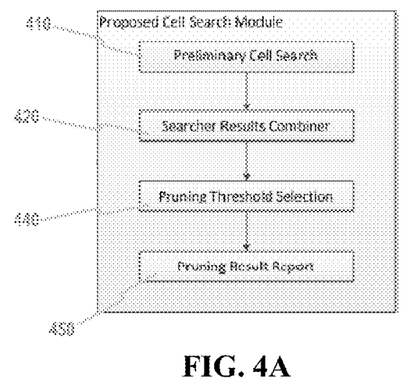
FIG. 4A is a schematic diagram of the procedures performed in a cell search according to an embodiment of the present disclosure.

FIG. 4A is a schematic diagram of the procedures performed in a cell search according to an embodiment of the present disclosure. Preliminary cell search module 410 and Pruning result report module 450 are substantially similar to Preliminary cell search module 310 and Pruning result report module 350 in FIG. 3, at least in relevant part, and will not be described again; however, Searcher results combiner module 420 and Pruning threshold selection module 440 are new, the details of each of which are discussed in reference to FIGS. 4B and 4C, respectively, below.

Searcher results combiner module 420 performs soft combining of the cell search results from multiple cell search attempts. As discussed above, the probability of ghost cells resulting from noise/interference being in multiple cell search results is relatively low, while the probability of existing cells showing up in multiple cell searches is relatively high, so the accumulated metrics of real cells should increase almost linearly while the accumulated metrics of ghost cells should mostly not increase at all. A similar approach may be taken to the $m_0$ and $m_1$ values as accumulated over time. More specifically, if a ghost cell and a true cell have the same $m_0$ sequence (in the cell search results), the $m_1$ correlation of the ghost cell will not accumulate as quickly as the in correlation of the true cell. Likewise, if a ghost cell and a true cell have the same $m_1$ sequence, then the $m_0$ correlation of the ghost cell will not accumulate as quickly as $m_0$ correlation of the true cell. Accordingly, the minimum of the $m_0$ and $m_1$ accumulated correlations is used as the pruning metric.

Thus, the Searcher results combiner module 420 must accumulate and manage multiple cell search results over time. To do so, Searcher results combiner module 420 maintains records for each candidate cell, which are revised/updated with each new set of search results. A forgetting factor is applied to maintain numerical stability and allow the searcher to track the channel change in real time. Records are deleted if their candidate cells do not show up in any search results over a certain period of time.

Figure 4B:
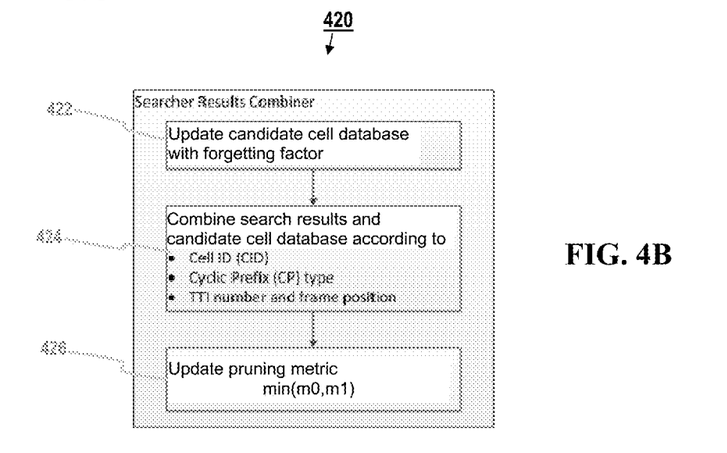
FIG. 4B is a schematic diagram of the Searcher Results Combiner module 420 from FIG. 4A according to an embodiment of the present disclosure.

FIG. 4B is a schematic diagram showing some of the pertinent details of the Searcher results combiner module 420 from FIG. 4A according to an embodiment of the present disclosure. Although the blocks shown are conceptually separable, in practice the operations may be combined and/or further divided. For example, the updating of the accumulated metrics in the candidate cell database with the forgetting factor (422) and combining the new cell search results (424) are performed somewhat simultaneously. More specifically, when raw cell search results are reported, it is first determined whether each of the candidate results has been reported before. In this embodiment, the matching criterion includes the cell ID (CID), cyclic prefix (CP) type, transmission time interval (TTI) number, and frame position. Depending on the embodiment, some minor timing shift tolerance (e.g, ±10), may be needed.

If a match for a candidate cell in the new results is not found, a new record is created. If a match is found, the new $m_0$ correlation ($m0_{single_{shot(n)}}$) and $m_1$ correlation ($m1_{single_{shot(n)}}$) is combined with the accumulated $m_0$ correlation ($m0_{accumulation[n-1]}$) and accumulated $m_1$ correlation ($m1_{accumulation[n-1]}$) of the existing record, but with a forgetting factor α, to generate an updated accumulated $m_0$ correlation ($m0_{accumutation[n]}$) and an updated accumulated $m_1$ correlation ($m1_{accumulation[n]}$) in order to update the record, as shown in Equations (2)(a) and (2)(b):

$$m0_{accumulation[n]} = m0_{accumulation[n-1]} \cdot \alpha + m0_{single_{shot[n]}} \quad (2)(a)$$

$$m1_{accumulation[n]} = m1_{accumulation[n-1]} \cdot \alpha + m1_{single_{shot[n]}} \quad (2)(a)$$

In this embodiment, the recommended value for the forgetting factor is α=0.9. This value is presently believed best based on simulations and lab test results. In other embodiments, however, different values may be used for the forgetting factor. As would be understood by one of ordinary skill in the art, selection of an appropriate forgetting factor depends on, for example, the particular implementation. Basically, as mentioned above, selecting the forgetting factor involves a tradeoff between performance degradation caused by too low a forgetting factor and low trackability caused by too high a forgetting factor. For example, in this embodiment, choosing a value greater than 0.9 would bring little benefit (in terms of performance) while at the same time reducing the searcher's trackability.

Any candidate cell record for which there has been no cell search results in the past N cell searches is eliminated from the candidate cell database. This will ensure that the size of the records is bounded by N×[the number of candidate cells in preliminary cell list]. In this embodiment, N is 10, but in other embodiments, however, different values may be used for eliminating "old" records. As would be understood by one of ordinary skill in the art, retaining more records is desirable, but the size of available memory is limited by the actual system implementation and thus any particular embodiment will involve a tradeoff.

There are usually duplicate cell search results, for multiple reasons. When PSS detection is oversampled in order to get finer timing resolution, there are usually multiple consecutive peaks from the PSS detection results. Because SSS detection is performed separately for each PSS candidate, multiple duplicated SSS detections with slightly different timings are the result.

Regarding duplicate cell search results, different approaches may be taken according to embodiments of the present disclosure. In this embodiment, duplicate cell search results are summed up and divided to provide a combined result, which simulation results have shown brings gains in accuracy. However, other embodiments may take other approaches, such as, for example, retaining the duplicate cell search result with the strongest signal and discarding the others.

As discussed above, this embodiment of the present disclosure does not perform any pruning procedures on the raw single shot cell search results, including $m_0/m_1$ ratio-based pruning, but rather performs pruning on cell search results accumulated over time. As shown in FIG. 4B, the Searcher results combiner module 420 from FIG. 4A last calculates the pruning metric ($metric_{output[n]}$) in 426 according to an embodiment of the present disclosure based on the minimum value between the accumulated $m_0$ and $m_1$ correlations, as shown by Equation (3):

$$metric_{output[n]} = \min(m0_{accumulation[n]}, m1_{accumulation[n]}) \quad (3)$$

The $metric_{output[n]}$ value is used along with the absolute and relative threshold values calculated by the Pruning threshold selection module 440 to prune the (updated) cell candidate list.

Figure 4C:
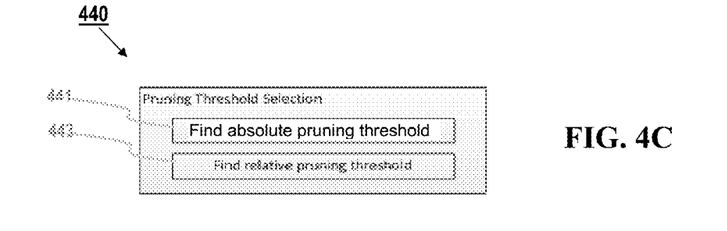
FIG. 4C is a schematic diagram of the Pruning Threshold Selection module 440 from FIG. 4A according to an embodiment of the present disclosure.

FIG. 4C is a schematic diagram showing some of the pertinent details of the Pruning threshold selection module 440 from FIG. 4A according to an embodiment of the present disclosure. Although the blocks shown in FIG. 4C are conceptually separable, in practice the operations may be combined and/or further divided. In 441, the absolute threshold is calculated using Equation (4):

$$\text{Absolute Threshold} = P\_ghost * scalingfactor1 \quad (4)$$

where P_ghost is the average correlation value (including both $m_0$ correlation and $m_1$ correlation) of all cell search results in a single-shot cell search. In an embodiment with multiple searches (i.e., multiple P_ghost values), an IIR filter can be applied over the multiple cell searches. There was no noticeable difference between these two approaches in test and simulation results.

A large scalingfactor1 will result in more MD and less FA, while a small scalingfactor1 will result in more FA and less MD. As would be understood by one of ordinary skill in the art, scalingfactor1 is selected to balance the MD and FA, while keeping both within the requirements, in light of cell configuration, channel conditions, the implementation environment, system design requirements, etc. For example, in one embodiment, scalingfactor1 may be selected so that MD and FA of the strongest MD is low. In this embodiment, scalingfactor1 is 11.

In 443 of the Pruning threshold selection module 440 as shown in FIG. 4C, the relative threshold is calculated using Equation (5):

$$\text{Relative Threshold} = \text{Peak Value} * scalingfactor2 \quad (5)$$

where Peak Value is the maximum of current metric outputs based on the minimum of m0 and m1 accumulated correlation. scalingfactor2 is less than scalingfactor1 because a smaller value leads to a better capability to detect weaker cells; however, this may also increase FAs. In this embodiment, scalingfactor2 is 0.2. Similarly to scalingfactor1, however, different values may be used for scalingfactor2 in other embodiments, taking into account cell configuration, channel conditions, the implementation environment, system design requirements, etc., as would be understood by one of ordinary skill in the art.

The additional calculations and accumulations discussed herein will introduce a processing delay in comparison to performing single shot cell searches with no accumulation. As would be understood by one of ordinary skill in the art, there are a number of ways to reduce and/or ameliorate the effects of this delay. For example, the cell search can be scheduled as often as every 40 ms for "Gap Pattern ID 0" or every 80 ms for "Gap Pattern ID 1" in LTE. The processing delay introduced has minimum impact on modem performance. As another example, a "stealing" mode for cell search operations could reduce this delay, as discussed below.

Figure 5A:
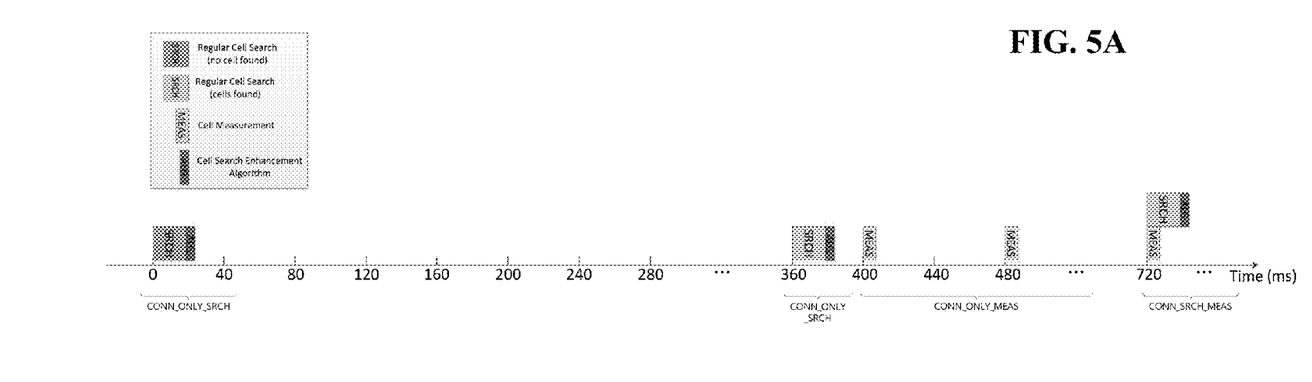
FIG. 5A is a timing diagram of the normal mode of operation according to an embodiment of the present disclosure.
Figure 5B:
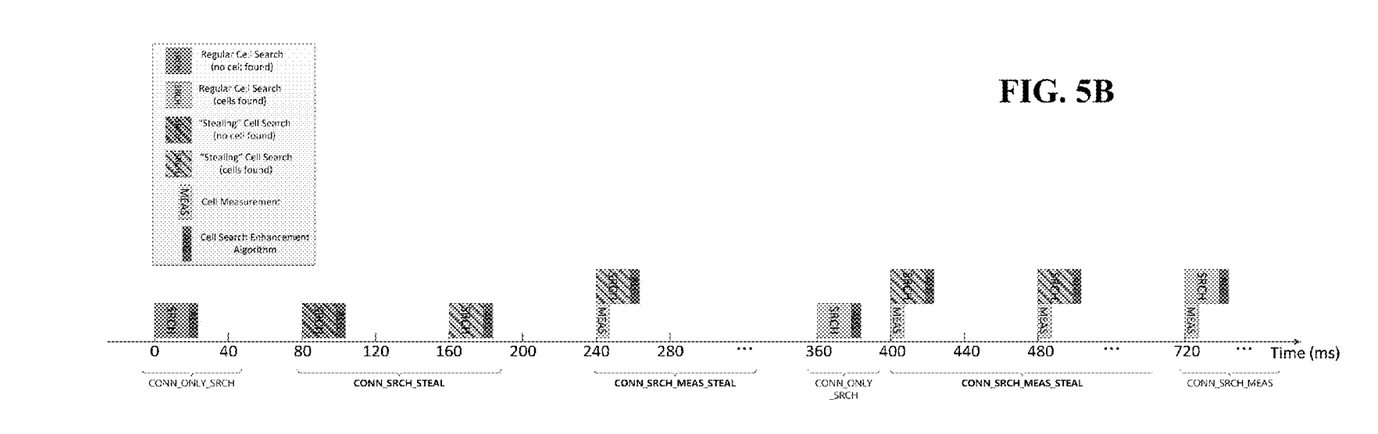
FIG. 5B is a timing diagram of the "stealing" mode of operation according to an embodiment of the present disclosure.

FIGS. 5A and 5B show two possible scheduling modes in accordance with embodiments of the present disclosure: a "normal" mode implemented without changing the current inter-frequency related scheduling (FIG. 5A) and a "stealing" mode which schedules extra cell search operations to combat accumulation delay (FIG. 5B). More specifically, in "stealing" mode, (1) if the initial cell search fails, instead of waiting for another cell search period, cell search only operations are scheduled when there is no conflict with the intra-frequency cell searches; and (2) once a cell search returns cell candidate(s), concurrent "cell search and measurement" operations are scheduled when there is no conflict with inter-frequency and intra-frequency cell searches. Of course, these are only two of the possible scheduling modes, as would be understood by one of ordinary skill in the art, and other scheduling modes are possible in accordance with the present disclosure.

FIG. 5A is a timing diagram of the normal mode of operation according to an embodiment of the present invention. In this embodiment, the following is assumed:
- an inter-frequency cell search (CONN_ONLY_SRCH) period=360 ms;
- an inter-frequency cell measurement (CONN_ONLY_MEAS) period=80 ms;
- initial inter-frequency cell search at time=0;
- measurement gap happens every 40 ms with length 6 ms (i.e., Measurement gap pattern 0);
- no measurement can be scheduled until one or more cells are found in a cell search; and
- cell search and measurement (CONN_SRCH_MEAS) can be concurrently scheduled on the same frequency.

The inter-frequency and intra-frequency measurements are scheduled, at the minimum, in 40 ms time slots, i.e., whether any inter/intra-frequency cell searches or measurements needs to be performed is checked every 40 ms. In this embodiment, it is also assumed that, due to processing delays, inter-frequency and intra-frequency cell searches cannot be scheduled concurrently in the same 40 ms time slot. If both cell search operations are triggered in the same time slot, higher priority will be given to the intra-frequency cell search. Inter-frequency cell search will be delayed until the next gap (40 ms later in the example). By contrast, inter-frequency and intra-frequency cell measurements can be scheduled concurrently in the same time slot (but actual measurements need to be performed one after another due to RF switching).

As shown in FIG. 5A, in normal mode, no extra cell search operations are scheduled or performed. The cell search scheduling remains the same. However, the accumulation/pruning operations are performed after each "single shot" cell search.

FIG. 5B is a timing diagram of the stealing mode of operation according to an embodiment of the present disclosure. The operations run under the same assumptions as normal mode; however, in stealing mode, extra cell search operations are scheduled. Since the accumulation according to the present disclosure requires that several "single shot" cell searches be performed in order to gain confidence in the results (~2 to 5 in this embodiment), scheduling extra "stealing" cell search operations reduces accumulation time. If there is a scheduling conflict with the intra-frequency cell searches or regularly scheduled inter-frequency cell searches, the "stealing" inter-frequency cell search will be dropped.

As observed in FIG. 5B, two extra measurement modes have been added on top of the "CONN_SRCH_MEAS", "CONN_ONLY_SRCH", and "CONN_ONLY_MEAS" modes shown in FIG. 5A:
CONN_SRCH_STEAL: if a cell search fails to return any valid cells, this "stealing" mode search is performed 80 ms after the failed search instead of waiting for another "CONN_ONLY_SRCH" mode cell search operation (which is still performed 360 ms after the initial search), assuming there are no scheduling conflicts with an intra-frequency cell search; and
CONN_SRCH_MEAS_STEAL: if a cell search returns any valid cell(s), this "stealing" concurrent cell search/measurement is performed assuming there are no scheduling conflicts with an intra-frequency cell search.

Various simulations have been performed, and a rough draft of the details and results of which are discussed in the APPENDIX attached hereto.

As shown by the examples and representative embodiments above, methods, systems, and apparatuses according to the present disclosure provide at least some of the following novel features: applying a forgetting factor to metrics accumulated over multiple consecutive cell searches; using the minimum of accumulated $m_0$ and $m_1$ correlations as a pruning metric; and using a simplified absolute/relative threshold for pruning using the pruning metric. In one embodiment, a "stealing" mode is used to reduce any processing and/or reporting delay caused by the accumulation and storage for the candidate cell database.

Depending on the embodiment of the present disclosure, steps and/or operations in accordance with the present disclosure may occur in a different order, or in parallel, or concurrently for different epochs, etc., in different embodiments, as would be understood by one of ordinary skill in the art. Similarly, as would be understood by one of ordinary skill in the art, FIGS. 4A, 4B, and 4C are simplified/conceptual representations of the actions performed, and real-world implementations may perform the actions in a different order or by different ways or means. Similarly, as simplified/conceptual representations, FIGS. 4A, 4B, and 4C do not show other required steps as these are known and understood by one of ordinary skill in the art and not pertinent and/or helpful to the present description.

Depending on the embodiment of the present disclosure, some or all of the steps and/or operations may be implemented or otherwise performed, at least in part, on a portable device. "Portable device" as used herein refers to any portable, mobile, or movable electronic device having the capability of receiving wireless signals, including, but not limited to, multimedia players, communication devices, computing devices, navigating devices, etc. Thus, mobile devices include, but are not limited to, laptops, tablet computers, Portable Digital Assistants (PDAs), mp3 players, handheld PCs, Instant Messaging Devices (IMD), cellular telephones, Global Navigational Satellite System (GNSS) receivers, watches, cameras or any such device which can be worn and/or carried on one's person. "User Equipment" or "UE" as used herein corresponds to the usage of that term in the 3GPP LTE/LTE-A protocols, but is not in any way limited by the 3GPP LTE/LTE-A protocols. Moreover, "User Equipment" or "UE" refers to any type of device, including portable devices, which acts as a wireless receiver.

Depending on the embodiment of the present disclosure, some or all of the steps and/or operations may be implemented or otherwise performed, at least in part, using one or more processors running instruction(s), program(s), interactive data structure(s), client and/or server components, where such instruction(s), program(s), interactive data structure(s), client and/or server components are stored in one or more non-transitory computer-readable media. In some embodiments of the present disclosure, the one or more processors include radiofrequency (RF) baseband modem chips and/or a system on a chip (SoC).

The one or more non-transitory computer-readable media may be instantiated in software, firmware, hardware, and/or any combination thereof. Moreover, the functionality of any "module" discussed herein may be implemented in software, firmware, hardware, and/or any combination thereof. To clearly illustrate this interchangeability, various illustrative components, blocks, modules, circuits, and steps have been described above generally in terms of their functionality. Whether such functionality is implemented as hardware, firmware, software or some combination thereof depends upon the particular application and design constraints imposed on the overall system. One of ordinary skill in the art would understand how to implement the described functionalities in various ways depending on each particular application/implementation, but such specific implementation/application decisions should not be interpreted as causing a departure from the scope of the present disclosure.

The one or more non-transitory computer-readable media and/or means for implementing/performing one or more operations/steps/modules of embodiments of the present disclosure may include, without limitation, application-specific integrated circuits ("ASICs"), standard integrated circuits, controllers executing appropriate instructions (including microcontrollers and/or embedded controllers), field-programmable gate arrays ("FPGAs"), complex programmable logic devices ("CPLDs"), and the like. Some or all of any system components and/or data structures may also be stored as contents (e.g., as executable or other non-transitory machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of any system components and data structures may also be stored as data signals on a variety of non-transitory computer-readable transmission mediums, from which they are read and then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced in any computer system configuration.

Thus, the term "non-transitory computer-readable medium" as used herein refers to any medium that includes the actual performance of an operation (such as hardware circuits), that includes programs and/or higher-level instructions to be provided to one or more processors for performance/implementation (such as instructions stored in a non-transitory memory), and/or that includes machine-level instructions stored in, e.g., firmware or non-volatile memory. Non-transitory computer-readable media may take many forms, such as non-volatile and volatile media, including but not limited to, a floppy disk, flexible disk, hard disk, RAM, PROM, EPROM, FLASH-EPROM, EEPROM, any memory chip or cartridge, any magnetic tape, or any other magnetic medium from which a computer instruction can be read; a CD-ROM, DVD, or any other optical medium from which a computer instruction can be read, or any other non-transitory medium from which a computer instruction can be read.

While certain embodiments of the present disclosure have been shown and described herein, it will be understood by those of ordinary skill in the art that various changes in form and details may be made therein without departing from the spirit and scope of the present disclosure—i.e., the invention is not limited to any embodiments described herein, but is defined by the appended claims and their equivalents.

Problem Statement

User equipment (UE) will occasionally report non-exist cells (aka "ghost" cells) in its measurement report (MR). This has adverse impact from radio resource management point of view. Therefore, it is important to design modem to reduce the false reporting of ghost cells. In the cell searcher context, efforts have been spent on reducing the false alarm (FA) rate and at the same time improving the detection performance.

The rest of the document is organized as follows: a cell searcher design is reviewed in Section 2, followed by the description of a new design in Section 3. In Section 4, a proof-of-concept SW implementation of the proposed enhancement is presented. Performance evaluation in the lab environment and comparison with current design are made in Section 5. In the conclusion, we summarize the FA and miss-detection (MD) trade off curves, from which we optimize the parameters to be used.

Existing Cell Searcher Design

In the cell searcher HW, a total 288 cell candidates are reported for each single shot cell search operation (PSS detections+SSS detection). Of course, most are false alarms. In order to reduce the false alarm, in current SW, a series of pruning procedures are performed directly on the single shot HW cell search results.

The main pruning procedures include:
1) Remove cell based on candidate SSS correlation value. (absolute threshold based pruning)
2) Remove cell based on ratio of candidate SSS correlation value to SSS correlation peak value among all candidates. (relative threshold based pruning)
3) Remove cell based on m0 and m1 correlation ratio
4) If there is duplicated CID found with different CP type or frame timing, only keep the strongest, and remove the duplicated CID.

Single shot cell searcher results can be very noisy and no consistence information (such as cell ID, CP type, etc) between consecutive searcher results is exploited. As a result, the tradeoff performance between FA and MD is not very good, i.e. pruning more FA will hurt MD performance a lot. Moreover, these multiple pruning procedures require multiple thresholds selection. It is quite difficult to tune multiple parameters and ensure good performance under various scenarios.

Proposed New Design

Ghost cells come mainly from two sources:
(1) Random noise and interference
(2) Imperfect PSS/SSS cross-correlation property between two different cell IDs. This is because (i) the cross-correlation of PSS/SSS sequence are not perfect, and (ii) two different CIDs may share same m0 sequence or m1 sequence.

To reduce the ghost cells from source (1), soft combining of cell searcher results from multiple cell search attempts can be used. The basic idea is: If a ghost cell is a result from noise or interference, due to its randomness, the probability of having the same ghost cell from multiple searcher results is low. So the accumulated metrics of ghost cells are mostly not increasing. However the accumulated metric of true cells increases almost linearly. By exploiting this consistence information between consecutive searcher results, the confidence of detection is greatly increased.

To reduce ghost cells from source (2), a proper accumulating matric and pruning method should be selected. In the existing design, a pruning based on m0/m1 ratio is performed to reduce the false alarm from (2). However, we found that using the m0 m1 ratio can lead to over-pruning when there are true cells with the same m0 or m1 sequence. To eliminate ghost cells, we should select a metric that ghost cells cannot accumulate well while the true cells can accumulate. In the case that a ghost cell and a true cell have the same m0 sequence, the m1 correlation of ghost cell doesn't accumulate as fast as the m1 correlation of the true cell. Likewise, if a ghost cell and a true cell have the same m1 sequence, then the m0 correlation of ghost cell doesn't accumulate as fast as m0 correlation of the true cell. Based on this observation, we select the metric as the minimum of m0 and m1 accumulated correlation.

More specifically, the following changes are proposed in the new designs:

1) Searcher Results Combiner

Added a new block to manage (add/remove/combine) searcher results. When a raw searcher result is reported, we first check if the result has been reported before. The matching criterion includes {CID, CP type, TTI number and frame position (with some minor timing shift tolerance, e.g. ±10)}. If a match is not found, a new record is created. Otherwise, we do an accumulation of the m0 correlation and m1 correlation output with the existing records. To allow the combiner to work consecutively:

A forgetting scaling factor is multiplied to existing records when new searcher results are combined. i.e. the m0 and m1 accumulation outputs are updated as follows:

$$m0_{accumuation[n]} = m0_{accumuation[n-1]} \cdot \alpha + m0_{singleshot[n]}$$

$$m1_{accumuation[n]} = m1_{accumuation[n-1]} \cdot \alpha + m1_{singleshot[n]}$$

The recommended value of forgetting factor is $\alpha=0.9$

Remove results that have not been reported in the last N searcher results. This will make sure the size of records is bounded by 36*N. The recommended value of N is 10.

2) Combining Duplicated Searcher Results with Similar Timing Rather than Removing the Duplicated Results Because of the oversampling in PSS detection in order to get finer timing resolution, there are usually multiple consecutive peaks from PSS detection results[1]. Each PSS candidate will perform SSS detection separately, which will result in multiple duplicated SSS detection results with slightly different timings. In current design, during the pruning procedure, duplicated results are removed except for the strongest one. In our new design, however, these duplicated results with similar timing are summed up. Our simulation results show that such a combining brings gains.

One possible explanation is that the sampling instants are not perfectly aligned with (physical) channel impulse, and therefore at baseband one will see a spread (in time) of the channel impulse response due to bandwidth-limited sampling at the receiver.

3) Pruning Changes:

Removed all pruning procedures for single shot raw searcher results, including m0/m1 ratio based pruning Single shot searcher results can be very noisy. Doing any pruning before accumulation may result in over pruning Single pruning of accumulated output Choose minimum of m0 and m1 accumulated correlation as the only metric for final pruning, i.e.

$$metric_{output[n]} = \min(m0_{accumuation[n]}, m1_{accumuation[n]})$$

4) Pruning Threshold Selection

To achieve a good tradeoff between FA and MD, A pruning threshold needs to be chosen carefully. A searcher result is pruned if its current accumulated metric output (minimum of m0 and m1 accumulated correlation) is below current calculated threshold, otherwise, the result will be reported.

Threshold selection is based on the following goals: 1) Detect strongest cell with low MD and low FA (high priority). 2) If there is margin, detect weaker cell with best effort (low priority). We define two types of thresholds Absolute Threshold: Absolute Threshold=P_ghost*scalingfactor1

P_ghost is the average correlation (including both m0 correlation and m1 correlation) value of all searcher results in a single-shot cell search. An IIR filter can be applied over multiple cell searches.

scalingfactor1 is selected such that both MD and FA of the strongest cell MD is low.

Relative Threshold: Relative Threshold=Peak Value*scalingfactor2

Here peak value is the maximum of current metric outputs based on the minimum of m0 and m1 accumulated correlation scalingfactor2 is less than 1. Choosing smaller value leads to better capability to detect weaker cell but may also increase FA.

To ensure low FA in both high SNR and low SNR regime, the final threshold is given by max(Absolute Threshold, Relative Threshold)

When SNR is high, Relative Threshold dominants and can further reduce FA

When SNR is low, Absolute Threshold dominants to ensure low FA and only use left margin for weaker cell detection.

Based on simulations, the recommended parameters are: scalingfactor1=11, scalingfactor2=0.2

It is worth to note that the proposed enhancement is not only applicable to LTE-to-LTE inter-frequency gap measurement scenario, but also applicable to any non-LTE-to-LTE scenarios.

It is also worth to note that the proposed enhancement will introduce slight processing delay (compared to one-shot processing) due to its accumulation operation across measurements. To reduce such delay, "stealing" mode operation is introduced (cf. Section 0) in SW implementation. Processing delay is also observed on reference device, which is seen to take 500 ms to send the first measurement report to eNB.

SW Implementation

To implement the proposed cell search SW enhancement algorithm, we propose to make certain changes in the RRM layer and the HAL layer.

The main reasons are as follow:

Scheduling

RRM layer controls the scheduling of inter-frequency cell search and measurements. Two scheduling schemes are proposed, namely "normal" mode and "stealing" mode. "Normal" mode can be implemented without changing the current inter-frequency related scheduling; whereas "stealing" mode schedules extra cell search operations to combat accumulation delay, which comes inherently with the proposed algorithm. For "stealing" mode, two improvements are made:

Instead of wait for another cell search period if initial cell search fails, cell search only operations are scheduled when there is no conflict with intra-frequency ones.

Once cell search operation returns successful cell candidate(s), concurrent "cell search and measurement" is scheduled when there is no conflict with inter-frequency and intra-frequency ones.

New Algorithm Implementation

The proposed algorithm operations are mainly executed in the HAL layer. HAL layer functions implement post-processing of SSS results of each "single shot" cell search operation.

Detail changes are provided in subsequent subsections.

1) Scheduling (RRM Layer)

RRM controls the scheduling of cell searches and measurements, including the inter-frequency ones. For example, we assume the following parameters and the current scheduling scheme for single inter-frequency EARFCN inter-frequency cell search/measurement period:
  cell search period: 360 ms
  cell measurement period: 80 ms
Measurement gap pattern 0, i.e. gap happens every 40 ms with length 6 ms
Scheduling illustration (empty time slots are intended for comparisons):
  Assume initial inter-frequency cell search operation starts from time 0.
  No measurement can be scheduled until one or more cells are found in the cell search operation.
  Cell search and measurement on the same frequency can be concurrently scheduled.

Note: In RRM, inter-frequency and intra-frequency measurements are scheduled in (min) 40 ms time slots, i.e. RRM will check every 40 ms whether there are inter/intra-frequency cell searches or measurements need to be performed. Due to HW processing delays, inter-frequency and intra-frequency cell searches cannot be scheduled concurrently in the same 40 ms time slot. If both cell search operations are triggered at the same time slot, higher priority will be given to intra-frequency cell search. Inter-frequency cell search will be delayed to the next gap (40 ms later in our example). In contrast, inter-frequency and intra-frequency cell measurements can be scheduled concurrently in the same time slot (but for sure, actual HW measurements need to be done one after another due to RF switching).

Proposed Scheduling Schemes

We introduce two modes for the new algorithm, namely "normal" mode and "stealing" mode.

"Normal" Mode

In this mode, there is no extra cell search operations scheduled. The cell search scheduling is the same as the current RRM defined. Accumulation/pruning of each "single shot" cell search is done at the end of each gap. The scheduling scheme for "normal" mode with one EARFCN is as follows in [FIG. 5B].

"Stealing" Mode

Extra cell search operations will be scheduled. Since the cell search SW enhancement algorithm requires accumulation across several "single shot" cell search (~2 to 5) to gain confidence, scheduling extra "stealing" cell search operations can reduce accumulation time. If there is a scheduling conflict with the intra-frequency cell searches or regularly scheduled inter-frequency cell searches, "stealing" inter-frequency cell search will be dropped. The scheduling scheme for "stealing" mode with one EARFCN can be illustrate as follows in [FIG. 5B].

As observed in [FIG. 5B], two extra RRM measurement modes have been added in LteRrm_ConnMeasMode_t on top of current "CONN_SRCH_MEAS", "CONN_ONLY_SRCH", and "CONN_ONLY_MEAS" modes:

CONN_SRCH_STEAL: This stealing mode kicks in if the initial cell search fails to return any valid cells. Instead of waiting for another "CONN_ONLY_SRCH" mode cell search operation (which will be 360 ms later in our example), cell search will be scheduled if there is no conflict with intra-frequency cell search.

CONN_SRCH_MEAS_STEAL: This stealing mode kicks in after valid cell(s) has been found. "Stealing" cell search will be scheduled concurrently with measurement if there are no scheduling conflicts.

2) New Algorithm Implementation (HAL Layer)

To implement the new cell search SW enhancement algorithm, a structure hal_srch_new_pruning_info_t is created in the hal_srch.h to keep track of cell search results and pruning thresholds. An instance of such structure is denoted as "accumulation pruning list", Pruning list is visible and maintained only in the HAL layer.

Keep track of up to 8 EARFCN for inter-frequency cell measurements (aligned with RRM inter-frequency list).

For each EARFCN, the pruning list can store up to 360 elements for cell candidate information.

Newly added HAL functions will
  Initialize pruning list at the beginning.
  Combine cell candidate information if cells according to the algorithm design (e.g. same CID, same CP, close cell timing).
  Update cell candidate metric with forgetting fact across "single shot" cell searches.
  Delete cell candidate element if any of the elements are not detected in 10 subsequent "single shot" cell searches.

Lab Results

The lab test results are encouraging. The new cell search enhancement algorithm for inter-frequency cell search scenario in AWGN channel has been tested. The test setup is as follow:

10 MHz serving cell on EARFCN 5790, with 2×2 MIMO
10 MHz neighbor cells on EARFCN 2525 with 2×2 MIMO.
NCell #1 and NCell #2 have perfect time alignment.
Pruning thresholds are given in Proposed New Design above, i.e. absolute threshold is 11, and relative threshold is 0.2.
MD is defined as $$MD = \frac{N_{miss}}{N_{CS}}$$

Where $N_{miss}$=number of times a perticular true cell is not in the search report after cell search
$N_{CS}$=number of cell search performed since (and include) 1st nonempty search report FA is defined as $$MD = \frac{N_{FA}}{N_{CS}}$$

Where
$N_{FA}$=number of times one (or more) fake cell(s) is in the search report after cell search

|  | Official Bin (Feb 21 TMO) | | | | | Proposed Algorithm (Normal Mode) | | | | | Proposed Algorithm (Stealing Mode) | | | | |
| --- | --- | --- | --- | --- | --- | --- | --- | --- | --- | --- | --- | --- | --- | --- | --- |
|  | NCell #1 (CID 0) | | NCell #2 (CID 90) | | | NCell #1 (CID 0) | | NCell #2 (CID 90) | | | NCell #1 (CID 0) | | NCell #2 (CID 90) | | |
| AWGN (dBm) | RSRP (dBm) | MD % | RSRP (dBm) | MD % | FA % | RSRP (dBm) | MD % | RSRP (dBm) | MD % | FA % | RSRP (dBm) | MD % | RSRP (dBm) | MD % | FA % |
| −100 | −100 | 2.4 |  |  | 3.7 | −100 | 0 |  |  | 3.7 | −100 | 0 |  |  | 1.9 |
| −100 | −103 | 33.8 |  |  | 2.3 | −103 | 0 |  |  | 0 | −103 | 0 |  |  | 0.2 |
| −100 | −106 | 92.1 |  |  | 0.3 | −106 | 2.4 |  |  | 0 | −106 | 3.3 |  |  | 0.0 |
| −100 | −100 | 96.2 | −96 | 42.4 | 11.4 | −100 | 0.0 | −96 | 0.0 | 0.5 | −100 | 0 | −96 | 0.0 | 0.1 |

Some observations can be summarized as follow:
The proposed algorithm significantly reduces cell MD rate and FA rate.
The proposed algorithm with either "normal" mode or "stealing" mode achieves comparable performance. However, the accumulation time using "stealing" mode is reduced by extra cell search operations scheduled.
Summary and Future Work
Based on the LLS simulation and lab results, we conclude that the proposed SW enhancement can greatly reduce the false alarm rate and improve the detection performance. The enhancement is done the in context of inter-frequency cell search. But the same methodology can also be used to improve the searcher performance in other contexts such as intra frequency cell search.
LLS Results and Parameter Selection
A S333 LLS was used to evaluate the MD/FA tradeoff performance, based on which, scaling factors for the threshold is selected. Here are the simulation parameters

| Parameter | Value |
| --- | --- |
| Duplex Mode | FDD |
| System bandwidth | 1.4 MHz (6RBs) |
| Carrier Frequency | 2680 MHz |
| AGC mode | Async TD-AGC mode (0.25 ms update rate) |
| Number of TX | 1 |
| Number of Rx | 1 or 2 |
| Max number of searcher results | 36 |
| CS accumulation forgetting factor | 0.9 |
| CS accumulation memory size | 10 (Delete a cell if it doesn't appear in consecutive 10 searcher results) |

Single Cell (CellID=0) 1Tx 1Rx, AWGN, SNR=−6 dB
We scanned both a scaling factor for the absolute threshold (from 5 to 25) and a scaling factor for the relative threshold (from 0.1 to 0.35). From the FA/MD trade off curves, we can see that by choosing around 10 for absolute threshold, both MD and FA are close to 0.
Two Cells
In two cell cases, we consider 3 different combinations of cell IDs.

1. Different PID CID=[0,91]
2. Same PID, different m0,m1, CID-[0,93]
3. Same PID, same m0 CID=[0,90]

Based on the simulation results, we recommended choosing an absolute threshold scaling factor between 10-17 for single receive antenna, and 13-20 for two receive antennas. Since in practice, false alarm (ghost cell) is more harmful than miss detection, it is recommended to choose higher range of scaling factor for absolute threshold For relative threshold selection, using a small scaling factor can result in high FA if when absolute threshold is also small. On the other hand, a larger scaling factor will limit the capability of reporting weaker cell, resulting performance floor in miss detection. Based on simulation results, we recommend relative threshold scaling factor to be around 0.2 as a good tradeoff between FA and capability to detect weaker cell.

What is claimed is:

1. A method, comprising:
performing a search for cells whose signals can be received by a user equipment (UE);
generating a preliminary candidate cell list comprising measurements for each candidate cell, if any, wherein the measurements result from the search for cells and comprise a metric for a first short code and a metric for a second short code, wherein a physical layer cell identity group for a cell is generated from the first and second short codes;
checking a candidate cell database for a candidate cell record matching each candidate cell in the preliminary candidate cell list, wherein each candidate cell record comprises accumulated measurements of a candidate cell;
updating the matching candidate cell record based on a candidate cell record matching a candidate cell in the preliminary candidate cell list, by combining the measurements of the corresponding cell candidate in the preliminary candidate cell list with the accumulated measurements in the matching candidate cell record;
generating a new candidate cell record for the candidate cell with the measurements of the cell candidate from the preliminary candidate cell list based on a candidate cell record not matching a candidate cell in the preliminary candidate cell list; and
generating a pruning metric for each candidate cell based on the accumulated measurements in its candidate cell record, wherein the pruning metric comprises the minimum of a value for the accumulated metric for the first short code and a value for the accumulated metric for the second short code.

2. The method of claim 1, wherein each candidate cell record further comprises a cell identity (CID) and at least one of a cyclic prefix (CP) type, a transmission time interval (TTI) number, and a frame number.

3. The method of claim 1, wherein combining the measurements of the corresponding cell candidate in the preliminary candidate cell list with the accumulated measurements in the matching candidate cell record comprises:
applying a forgetting factor to the accumulated measurements when they are combined with the measurements of the corresponding cell candidate in the preliminary candidate cell list.

4. The method of claim 1, further comprising:
removing any candidate cell record from the candidate cell database if a predetermined number of consecutive cell searches provided no measurements for the candidate cell corresponding to the candidate cell record.

5. The method of claim 1, further comprising:
generating an absolute threshold; and
adding a candidate cell to a final candidate cell list if its pruning metric is less than a margin from the absolute threshold.

6. The method of claim 5, wherein the absolute threshold is generated from a first scaling factor and a value derived from an average correlation value of one or more cell searches.

7. The method of claim 5, further comprising:
generating a relative threshold; and
adding the candidate cell to the final candidate cell list if its pruning metric is within the margin from the absolute threshold but below the relative threshold.

8. The method of claim 7, wherein the relative threshold is generated from a second scaling factor and a value derived from a peak value from among the minimums of the value for the accumulated metric for the first short code and the value for the accumulated metric for the second short code of each of the candidates in the preliminary candidate cell search list.

9. The method of claim 1, further comprising:
if the search for cells provides no candidate cells, performing another search for cells at a predetermined time after the unsuccessful cell search, unless an intra-frequency cell search is scheduled at that time.

10. The method of claim 9, further comprising:
repeatedly performing another search for cells at a predetermined time after the last unsuccessful cell search, unless an intra-frequency cell search is scheduled at that time, until a search for cells results in one or more candidate cells.

11. The method of claim 1, further comprising:
if the search for cells provides any candidate cells, concurrently performing a cell measurement and another search for cells at a predetermined time after the successful cell search, unless an intra-frequency or inter-frequency cell search is scheduled at that time.

12. A user equipment (UE), comprising:
one or more non-transitory computer-readable media, wherein at least one of the one or more non-transitory computer-readable media stores a set of instructions; and
one or more processors, wherein at least one of the one or more processors, when executing the set of instructions stored in the at least one of the one or more non-transitory computer-readable media, controls the UE to perform at least the following steps:
performing a search for cells whose signals can be received by the UE;
generating a preliminary candidate cell list comprising measurements for each candidate cell, if any, wherein the measurements result from the search for cells and comprise a metric for a first short code and a metric for a second short code, wherein a physical layer cell identity group for a cell is generated from the first and second short codes;
checking a candidate cell database for a candidate cell record matching each candidate cell in the preliminary candidate cell list, wherein each candidate cell record comprises accumulated measurements of a candidate cell;
updating the matching candidate cell record based on a candidate cell record matching a candidate cell in the preliminary candidate cell list, by combining the measurements of the corresponding cell candidate in the preliminary candidate cell list with the accumulated measurements in the matching candidate cell record;
generating a new candidate cell record for the candidate cell with the measurements of the cell candidate from the preliminary candidate cell list based on a candidate cell record not matching a candidate cell in the preliminary candidate cell list; and
generating a pruning metric for each candidate cell based on the accumulated measurements in its candidate cell record, wherein the pruning metric comprises the minimum of a value for the accumulated metric for the first short code and a value for the accumulated metric for the second short code.

13. The UE of claim 12, wherein at least one of the one or more non-transitory computer-readable media stores at least a portion of the candidate cell database and at least one of the one or more processors, when executing the set of instructions stored in the at least one of the one or more non-transitory computer-readable media, maintains the at least a portion of the candidate cell zone database.

14. The UE of claim 12, wherein each candidate cell record further comprises a cell identity (CID) and at least one of a cyclic prefix (CP) type, a transmission time interval (TTI) number, and a frame number.

15. The UE of claim 12, wherein combining the measurements of the corresponding cell candidate in the preliminary candidate cell list with the accumulated measurements in the matching candidate cell record comprises:
applying a forgetting factor to the accumulated measurements when they are combined with the measurements of the corresponding cell candidate in the preliminary candidate cell list.

16. The UE of claim 12, wherein at least one of the one or more processors, when executing the set of instructions stored in the at least one of the one or more non-transitory computer-readable media, controls the UE to perform the following step:
removing any candidate cell record from the candidate cell database if a predetermined number of consecutive cell searches provided no measurements for the candidate cell corresponding to the candidate cell record.

17. The UE of claim 12, wherein at least one of the one or more processors, when executing the set of instructions stored in the at least one of the one or more non-transitory computer-readable media, controls the UE to perform the following steps:
generating an absolute threshold; and
adding a candidate cell to a final candidate cell list if its pruning metric is less than a margin from the absolute threshold.

18. The UE of claim 17, wherein the absolute threshold is generated from a first scaling factor and a value derived from an average correlation value of one or more cell searches.

19. The UE of claim 17, wherein at least one of the one or more processors, when executing the set of instructions stored in the at least one of the one or more non-transitory computer-readable media, controls the UE to perform the following steps:
   generating a relative threshold; and
   adding the candidate cell to the final candidate cell list if its pruning metric is within the margin from the absolute threshold but below the relative threshold.

20. A user equipment (UE), comprising:
   one or more antennas; and
   a modem chip which:
      performs a search for cells whose signals can be received by the UE;
      generates a preliminary candidate cell list comprising measurements for each candidate cell, if any, wherein the measurements result from the search for cells and comprise a metric for a first short code and a metric for a second short code, wherein a physical layer cell identity group for a cell is generated from the first and second short codes;
      checks a candidate cell database for a candidate cell record matching each candidate cell in the preliminary candidate cell list, wherein each candidate cell record comprises accumulated measurements of a candidate cell;
      updates the matching candidate cell record based on a candidate cell record matching a candidate cell in the preliminary candidate cell list, by combining the measurements of the corresponding cell candidate in the preliminary candidate cell list with the accumulated measurements in the matching candidate cell record;
      generates a new candidate cell record for the candidate cell with the measurements of the cell candidate from the preliminary candidate cell list based on a candidate cell record not matching a candidate cell in the preliminary candidate cell list; and
      generates a pruning metric for each candidate cell based on the accumulated measurements in its candidate cell record, wherein the pruning metric comprises the minimum of a value for the accumulated metric for the first short code and a value for the accumulated metric for the second short code.

\* \* \* \* \*